UNITED STATES PATENT OFFICE.

PHILIP HELD, OF AURORA, INDIANA.

IMPROVEMENT IN LUBRICATING COMPOUNDS FOR SEWING-MACHINES.

Specification forming part of Letters Patent No. 126,887, dated May 21, 1872.

Specification describing a certain Compound called Sewing-Machine Oil, invented by PHILIP HELD, of the city of Aurora, in the county of Dearborn, in the State of Indiana, to be used in lubricating sewing-machines, as well as all other light machinery.

The nature of the invention of the said PHILIP HELD consists in mixing fine sperm-oil, crude petroleum-oil, spirits of turpentine, and oil of winter-green.

To prepare the sewing-machine oil, I take a quantity of fine sperm-oil—say, three gallons of sperm-oil—two quarts crude petroleum-oil; one quart of spirits of turpentine; a half pound of oil of winter-green. Mix all well together; then take a tin vessel, made for any given quantity, in shape, say, twice the height of the diameter, with a perforated tin or fine wire-sieve bottom; spread over the bottom two thicknesses of woolen blanket or thick woolen cloth; place upon the cloth so arranged in the vessel above described three inches of pulverized charcoal; cover the charcoal with three thicknesses of a thick woolen blanket or cloth; place the vessel thus prepared over another vessel of proper size; pour the mixture into the upper vessel and let it drain or filter through the woolen cloths and charcoal.

The oil thus produced is ready for use. The crude petroleum-oil and spirits of turpentine liquefy the sperm-oil, while the spirits of turpentine at the same time, to some extent, deodorizes the crude petroleum-oil and sperm-oil. The winter-green gives the sewing-machine oil a pleasant and agreable odor.

The sewing-machine oil is a full protection from rust, free from gum, and easily extracted from cloth or goods with which it may by chance come in contact.

I claim as the invention of the said PHILIP HELD—

A compound, of fine sperm-oil, crude petroleum-oil, spirits of turpentine, the oil of winter-green, substantially in the proportions, and prepared in the manner and for the uses and purposes set forth.

PHILIP HELD.

Witnesses:
JONATHAN B. GERARD,
ELIJAH CHRISTOPHER.